(12) United States Patent
Vidrio et al.

(10) Patent No.: US 6,361,596 B1
(45) Date of Patent: Mar. 26, 2002

(54) PROCESS FOR CONVERTING WELL DRILL CUTTINGS INTO RAW MATERIALS FOR THE PRODUCTION OF CEMENT, AND CEMENT COMPOSITIONS OBTAINED THEREFROM

(75) Inventors: Cesar Anatolio Carcia Vidrio, Naucalpan; Denzil Cotera Vazquez; Jorge Enrique Hernandez de la Rosa, both of Tabasco, all of (MX)

(73) Assignee: Cementos Apasco S.A. de C.V., Colonia Chapultepec Polanco (MX)

( * ) Notice: Subject to any disclaimer, the term of this patent is extended or adjusted under 35 U.S.C. 154(b) by 0 days.

(21) Appl. No.: 09/424,391
(22) PCT Filed: Mar. 24, 1999
(86) PCT No.: PCT/IB99/00506
§ 371 Date: Nov. 24, 1999
§ 102(e) Date: Nov. 24, 1999
(87) PCT Pub. No.: WO99/48831
PCT Pub. Date: Sep. 30, 1999

(30) Foreign Application Priority Data

Mar. 26, 1998 (MX) .............................................. 982378

(51) Int. Cl.[7] .............................................. C04B 7/24
(52) U.S. Cl. ...................................... 106/739; 106/745
(58) Field of Search ................................. 106/739, 745

(56) References Cited

U.S. PATENT DOCUMENTS

| | | |
|---|---|---|
| 3,168,139 A | 2/1965 | Kennedy et al. |
| 4,793,423 A | 12/1988 | Knol ........................... 175/66 |
| 4,809,791 A | 3/1989 | Hayatdavoudi .............. 175/40 |
| 4,880,468 A | 11/1989 | Bowlin et al. ................. 106/98 |
| 4,942,929 A | 7/1990 | Malachosky et al. ......... 175/66 |
| 5,058,679 A | 10/1991 | Hale et al. ................... 166/293 |
| 5,213,160 A | 5/1993 | Nahm et al. ................. 166/293 |
| 5,277,519 A | 1/1994 | Nahm ........................ 405/128 |
| 5,341,882 A | 8/1994 | Hale .......................... 166/293 |
| 5,370,185 A | 12/1994 | Cowan et al. .............. 166/293 |
| 5,476,144 A | 12/1995 | Nahm et al. ................. 166/293 |
| 5,580,379 A | 12/1996 | Cowan ....................... 106/789 |

FOREIGN PATENT DOCUMENTS

| | | |
|---|---|---|
| DE | 19815205 A1 | 4/1998 |
| DE | 198 15 205 A 1 | 10/1998 |
| SU | 1055073 | * 12/1993 |
| WO | 94/29231 | 12/1994 |

OTHER PUBLICATIONS

Chemical Abstracts, vol. 106, No. 26, Jun. 1987 Columbus, Ohio, US; abstract No. 218661v, K. Jokuthy, et al.: p. 310; XP002105385 see abstract & HY 40 386 A (ID), (No Date Available).

Database WPI Week 7730 Derwent Publications Ltd., London, GB; AN 77–53204y XP002105386 & JP 52 071522 A (Mitsubishi Mining & Cement Co).

* cited by examiner

Primary Examiner—Paul Marcantoni
(74) Attorney, Agent, or Firm—Pillsbury Winthrop LLP

(57) ABSTRACT

This process for converting well drill cuttings into raw materials for the production of cement includes the steps of extracting limestone and clay, crushing and prehomogenizing the extracted materials, raw grinding and adjusting the composition by adding correctives, producing clinker in rotary kiln and cement grinding. Water based drill cutting sludge is introduced in the crushing and prehomogenizing step and oil-based drill cutting sludge is fed into the rotary kiln.

6 Claims, 2 Drawing Sheets

PROCESS FOR CONVERTING WELL DRILL CUTTINGS INTO RAW MATERIALS FOR THE PRODUCTION OF CEMENT, AND CEMENT COMPOSITIONS OBTAINED THEREFROM

BACKGROUND OF THE INVENTION

1. Field of the Invention

This invention relates to a method and system for concluding the benefits of combining the synergies of waste of a well drilling process with waste of a cement process for the utilization of raw materials and/or thermal energy.

2. Description of the Related Art

U.S. Pat. No. 4,793,423 entitled "Process for treating drilled cuttings" of Beth C. Knol, granted on Dec. 27th, 1988 relates to processing used drilling liquids, drilled cuttings and salt contaminated soil, etc. in order to produce saline wash water suitable for injecting into a disposal well and size-graded substantially salt-free materials suitable for construction operations or non-hazardous waste disposal.

U.S. Pat. No. 4,809,791 entitled "Removal of rock cuttings utilizing an automatically adjustable shaker system" of Asadollah Hayatdavoudi, granted on Mar. 7th, 1989 relates to a system for the optimization of particle separation in a shaker system of a well drilling system.

U.S. Pat. No. 4,880,468 entitled "Waste solidification composition and methods" of David A. Bowlin and Michael J. Seuman, granted on Nov. 14th, 1989 relates to a composition for the solidification of waste comprising hydraulic cement, fly ash and fumed silica material and to a method of disposing of waste materials such as drilling muds and cuttings that result from drilling an oil and gas well.

U.S. Pat. No. 4,942,929 entitled "Disposal and reclamation of drilling wastes" of Edward Malachosky and Donna M. Lantero, granted on Jul. 24th, 1990 relates to drill cuttings comprising usable gravel, silts, clays and spent drilling fluid, which are recovered and discarded during or after the process of drilling a well by separating construction-grade gravel from drilling fluid and washing the gravel, if necessary, prior to storage or placing it in use as construction material.

U.S. Pat. No. 5,058,679 entitled "Solidification of water based muds" of Arthur H. Hale and Kenneth M. Cowan, granted on Oct. 22nd, 1991 relates to a drilling mud, which is converted in-situ to a cement by addition of blast furnace slag.

In U.S. Patent No. 5,277,519 entitled "Well drilling cuttings disposal" of James J. W. Nahm, granted on Jan. $11^{th}$, 1994 drilled cuttings are eliminated by solidification by drilling with a drilling fluid containing blast furnace slag, thereby producing drilled cuttings and other solid wastes, concentrating the wastes and then solidifying the concentrated wastes. Drilling wastes solidified by blast furnace slag are hard and not washable and the blast furnace slag is compatible with both oil and water based drilling mud and drilled cuttings.

U.S. Pat. No. 5,213,160 entitled "Method for conversion of oil-base mud to oil mud-cement" of James J. W. Nahm and Reece E. Wyant, granted on May 25th, 1993 relates to a water-in-oil emulsion drilling fluid, which can be converted into an oil mud-cement slurry for use in oil well cementing procedures.

In U.S. Patent No. 5,314,882 entitled "Well drilling cuttings disposal" of Arthur H. Hale, granted on Aug. 30th, 1994 well cuttings are removed by solidification by combining the cuttings with water and blast furnace slag and injection of the cuttings, water and slag into an annulus surrounding a well jacket and solidifying the cuttings, water and slag. Solidification in blast furnace slag cement is inexpensive, and the blast furnace slag is compatible with both oil and water based drilling mud.

U.S. Pat. No. 5,580,379 entitled "Emulsion in blast furnace slag mud solidification", granted on Dec. 3rd, 1996 relates to a cementous slurry prepared from drilling fluid, blast furnace slag and an emulsion comprising an oil external phase and an aqueous internal phase. After the cement slurry has been mixed and pumped into position in a bore, the emulsion breaks and the additives are released.

U.S. Pat. No. 5,476,144 entitled "Conversion of oil-base mud to oil-mud cement" granted on Dec. 19th, 1995 relates to a drilling fluid with a water-in-oil emulsion, which can be converted into an oil mud-cement slurry for use in oil well cementing procedures.

U.S. Pat. No. 5,370,185 entitled "Mud solidification with slurry of Portland cement in oil", granted on Dec. 6th, 1994 relates to producing a cement slurry by combining an aqueous drilling fluid with a slurry of Portland cement in oil. The resulting composition has a particular utility in primary cementing operations for oil wells.

As it is shown by the above mentioned patents, at the moment there exist few alternatives for treating residues, and the final dispositions are all insufficient for treating the residues considering the large quantities generated through the development of the exploitation of crude oil.

SUMMARY OF THE INVENTION

During well drilling basically two types of argilliferous residues are generated. The first residues are called "water-based drill cuttings", which are products of drilling in stable geological zones. The second residues result while drilling in unstable geological zones. To the latter materials such as oil-containing minerals, crude oil, asphalt, diesel oil, densifying additives, emulsifying agents, dispersing agents, dewatering inhibitors and viscousifier, thickening agents or liquefier, are added during well drilling, These oil-containing materials together with clays are collectively referred to as the so called "inverse emulsion or oil based drill cuttings".

In the form in which they are generated, both residues contain argilliferous materials, mainly with contents of silicium oxide, aluminum oxide and calcium oxide. These oxides are part of the oxides forming the chemical composition of the raw materials for the production of cement. Thus, the invention involves the conversion of drill cuttings and in particular well drill cuttings to cement.

In accordance with an embodiment of this invention, a process is provided for converting well drill cuttings into raw materials for cement production. The process comprises extracting limestone and clay, the crushing and pre-homogenizing the extracted limestone and clay to produce materials having a size not greater than 2.54 cm, with a maximum of 5% being retained in a 3.81 cm mesh. At this crushing and pre-homogenization stage, water-based drill cutting slug is added. The water-based cutting slug can containing particles having sizes of between 0.03 mm and 0.06 mm. The raw materials are subject to grinding, and adding corrective amounts of silica, alumina, iron, or calcium are added to form a mixture, which is dried to a moisture content of not more than 1% to obtain a powder. The powder is stored as compressed air is blown over the powder. The homogenized powder is subjected to clinker production comprising pre-heating the homogenized powder in cyclones to between 280° C. and 350° C., pre-calcining the pre-heated powder between 1,000° C. and 1,100° C. in a secondary burner, and feeding the pre-calcined powder into a rotary kiln to heat the pre-calcined powder to at least 1,450° C. and to generate gases of 1,800° C. to 2,000° C. Oil-based drill cutting slug is introduced into the clinker production to thermally destruct contaminants. Cement grinding is then performed.

This method of integrating drill cuttings into the process of cement additionally provides the advantage of using the drilling sludge as raw material for the production of cement, i.e. "the use of the energy and/or the thermal destruction of the oil based sludge, which has been contaminated during well drilling."

This secure final disposition of the residues generated from well drilling by using the residues in the cement process results in avoiding or reducing ground and water contamination, recycling of argilliferous materials and thermal destruction of the sludge contaminated with hydrocarbons, thus having favorable and sustainable effects on our environment.

In many operations of gas or oil wells the drilling fluid and the materials captured by the fluid during the operation give rise to an increasing problem with respect to their handling and disposal. Superficial disposal of drilling sludge and cuttings is prohibited or undesired by regulations and environmental considerations. On the other hand, certain categories of materials produced by well drilling can be recovered as construction materials as well as various grades of sands and gravel.

An object of the present invention is the conversion of well drill cuttings into raw materials for the production of cement.

A further object of the present invention is a method for performing said conversion.

Another object of the present invention is the development of a solution for the problems of ground and water contamination in the vicinity of well drilling.

The invention has as another object the recycling and/or thermal destruction of the sludge contaminated with hydrocarbons, thus having a favorable and sustainable effect on our environment.

Additional characteristics of the invention, its nature and various advantages will become more apparent from the enclosed drawings and the following detailed description of the preferred embodiments.

DETAILED DESCRIPTION OF THE INVENTION

Figure 1:
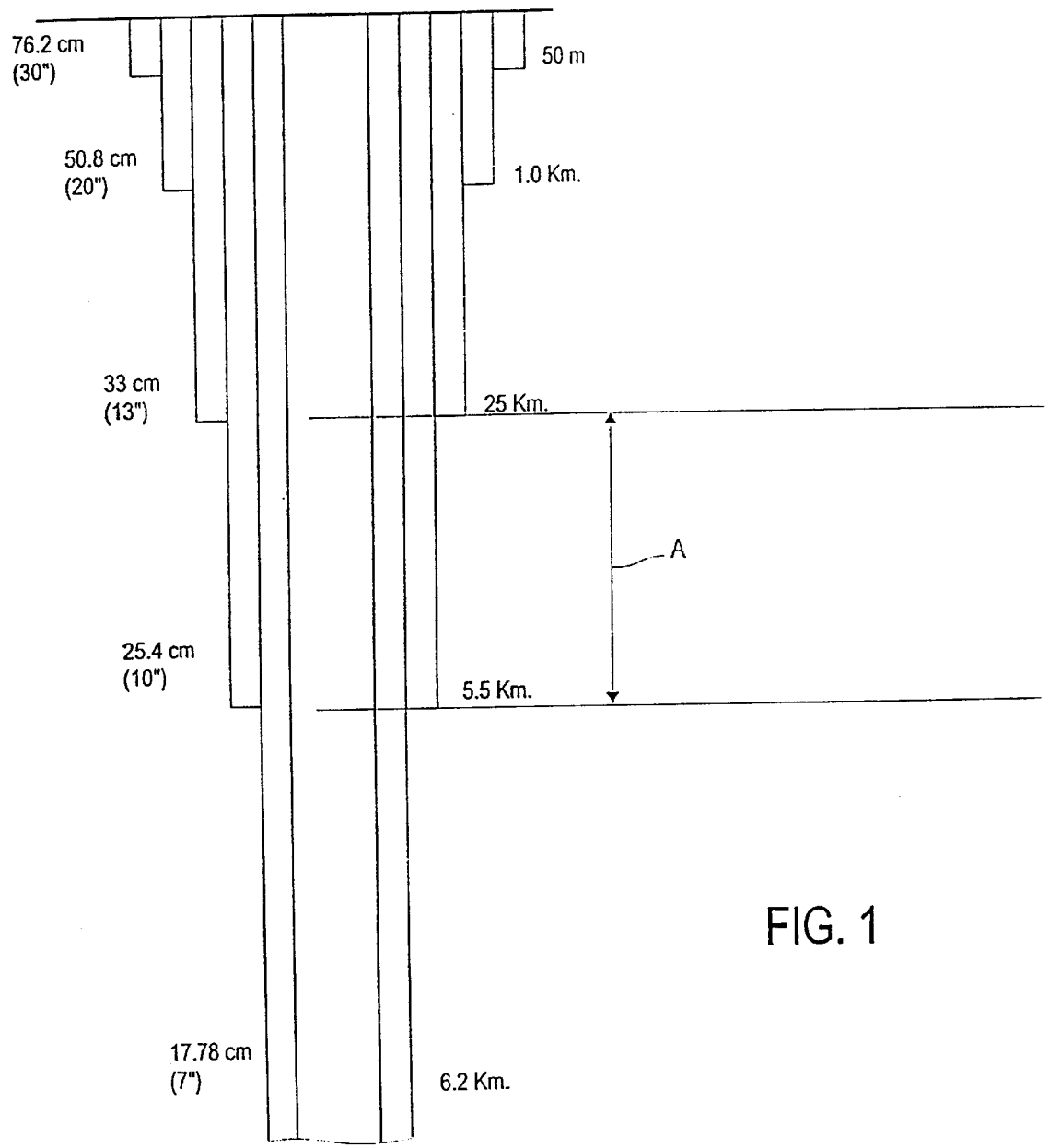
FIG. 1 is a schematic diagram, which illustrates the distribution of the diameter of the ducts on the left side in relation to the depth of the well on the right side for typical well drilling.

From FIG. 1, in which A represents oil containing drill cuttings with a lithology of clays and sands in abnormal pressure zones, about 500 m³ equal to about 1000 tons, the average generation of well drilling cuttings which have to be considered as residues, as function of the depth can be deduced. The composition of these residues generally results in about 80% clays, 10% quartz, 3% calcite, 4% hematite, 2% muscovite and occasionally 0.7% chlorite.

Generally in a depth between 2.5 km and 5.5 km unstable zones with abnormal pressures are found, where the addition of hydrocarbons and additives is specified. That is why the drill sludge comes out of the well generally contaminated with materials like oil-containing minerals, diesel oil, naphtha, asphalt, silica and contaminated clay, used as densifying agents, emulsifying agents, dispersing agents, dewatering inhibitors and viscousifier, thickening agents or liquefier.

The remaining drill cuttings do not require the addition of hydrocarbons and are called water-based drill cuttings.

Typical characteristics of well drilling additives are inclusion of one or more of the following components:

Oil-containing mineral and distilled fuel (Naphtha), asphalt, kaolin, silica, gilsonite asphalt, methyl alcohol, diesel oil, long-chain fatty acids in oil containing minerals, a mixture of fatty salt of imidazole and organic sulfonate of calcium, contaminated clay, organic resins, mixture of modified diamine and polybasic acid (solvent isoparaffin), $CaCl_2$, oxidized fatty acid derived from oil, dipropylene glycol methyl ether, ammonium and humic acid derived from Leonardite, contaminated clay derived from a quaternary ammonium composition and montmorillionite, conditioners for inverse emulsion.

Figure 2:
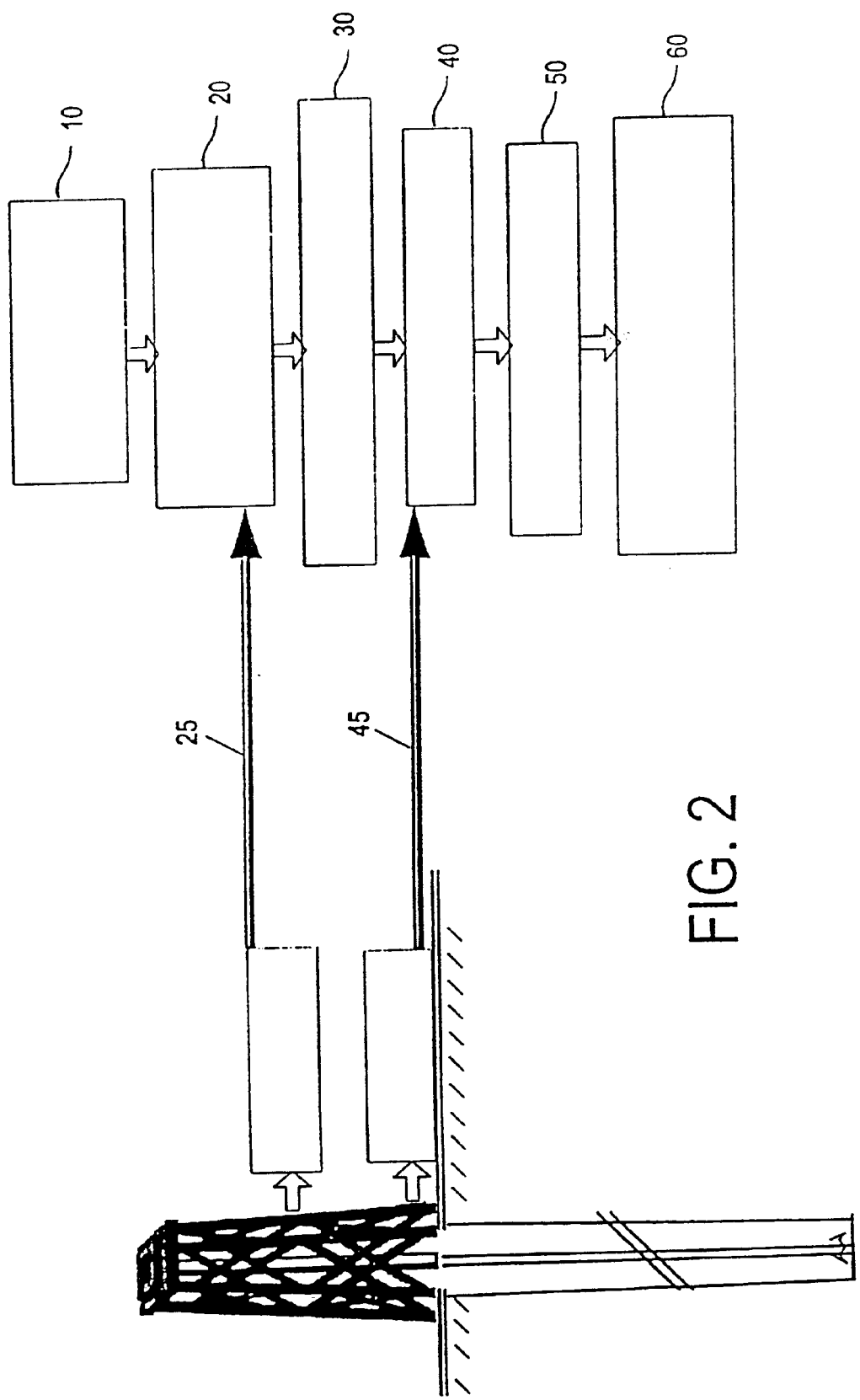
FIG. 2 represents by the way of a diagram the steps of the procedure of converting the drilling cuttings into raw material for the production of cement.

FIG. 2 on the one hand comprises the generation of well drill cuttings by well drilling and on the other hand the integration of the cuttings in the steps of the cement process. In FIG. 2, reference numeral 10 represents the step of charging of the raw materials and reference numeral 20 represents a step of crushing and prehomogenization. The water-based drilling cuttings 25 are added at step 20, and thereupon follows a step of grinding the raw materials, whereupon the production of clinker 40 is proceeded. At this step of production of the clinkers the oil-based drilled cuttings 45 are added, thereupon follows grinding of the cement 50 whereupon follows storing and distribution of the cement 60. Reference numeral 30 denotes the raw grinding.

The following example is merely illustrative and does not limit the invention in any way.

EXAMPLE

In order to corroborate the benefits of the present invention developed by ECOLTEC, a subsidiary of Cementos Apasco, S. A. de C. V., it was necessary to involve the National Ecology Institute in order to count on its authorization, the Universidad Autonoma Metroplitana as a guarantee of the performed experiments and the Mexican Institute of Petrol with its surveying and analyzing equipment and obviously with its drilling area.

The objective was based on including the water-based hydrocarbon-free sludge in the step of disintegration and prehomogenization of the cement process and the oil-containing sludge in the step of clinker production between 1000 and 1100° C. in a specific place of the furnace system.

Experiments with and without oil-based sludge were carried out in order to prove the benefits in relation to the reaction of the sludge in the furnace process, the cement process and the chimney emissions. Experiments including the residues were carried out in the cement plant in Macuspana, Tabasco, Mexico in August 1997.

The following can summarize the results of the experiments:

With regard to the chimney gas emissions such as NOx, $SO_2$, HCt, HCl, CO, $CO_2$, $O_2$ and total suspended particles it was found that including the sludge has no influence on NOx and HCl, that $SO_2$, CO and $CO_2$ were reduced with the sludge and that HCt and particles require a better control of mixture and proportion of the sludge.

Taking into account the results of the heavy metals Cd, Hg, As, Co, Ni, Se, Sb, Pb, Cr, Cu, Mn, V and Sn it was found that the sum of the maximum values of the emissions of all metals in solid as well as in gaseous state results in 0.0282 mg/$Nm^3$ was a rather negligible value. These results proved and confirmed the reason for the incorporation of said residues, because once the heavy metals generally, except the Hg, are in the "clinker-cement-concrete", where they are not soluble, they stay encapsulated.

In accordance with the chemical behavior, the incorporated residues constituted between 1.5–4% of the total raw materials.

Regarding that recycling would be most important for the raw materials the result referring to energy turned out to be relative, related to the total thermal consumption of the system once 3% were lost, some other time 1% was produced.

From the results summarized above this process turns out to be a secure final disposition of the residues generated by well drilling, thereby reducing contamination of ground and water. By as recycling and/or thermal destruction of the sludge contaminated with hydrocarbons, this process has a favorable and sustainable effect on our environment.

The development of the experiments of incorporation of the residues were carried out in August 1997 at the cement plant in Macuspana, Tabasco, which is a part of the Apasco group together with the plants of Orizaba, Veracruz; Apaxco, State of Mexico; Ramos Arizpe, Coahuila; Acapulco Guerrero and Tecoman, Colima.

The experiments were carried out with the authorization of the National Ecology Institute, under the participation of the Coordination of Environment Technology of the Mexican Institute of Petrol (IMP) with its mobile laboratories for monitoring contaminating emissions of stationary sources and the Autonomous Metropolitan University, department Azcapotzalco (UAM-AZC) taking part as an arbitrative authority of certification.

It goes without saying, that the above is merely illustrating the principles of the invention and that various embodiments can be made by anyone skilled in the art without deviating from the scope and spirit of the invention.

It is ascertained that with reference to this date the best method known to the solicitor for carrying out the cited invention is the one that clearly results from the present specification of the invention.

Having described the invention as above the following is claimed:

1. A process for converting well drill cuttings into raw materials for cement production, said process comprising:
   (a) providing limestone and clay;
   (b) crushing and pre-homogenizing the limestone and clay to produce crushed and pre-homogenized materials having a size not greater than 2.54 cm, with said crushing being conducted with an efficiency that a maximum of 5% is retained in a 3.81 cm mesh;
   (c) raw grinding the crushed and pre-homogenized materials, adding corrective amounts of silica, alumina, iron, or calcium to form a mixture, drying the mixture to a moisture content of not more than 1% to obtain a powder, and storing the powder while blowing compressed air for homogenization;
   (d) subjecting the homogenized powder to clinker production comprising pre-heating the homogenized powder in cyclones to between 280° C. and 350° C., pre-calcining the pre-heated powder between 1,000° C. and 1,100° C. in a secondary burner, and feeding the pre-calcined powder into a rotary kiln to heat the pre-calcined powder to at least 1,450° C. and to generate gases of 1,800° C. to 2,000° C.; and
   (e) cement grinding the powder and producing cement, wherein said crushing and pre-homogenizing (b) further comprises introducing water-containing drill cutting sludge containing particles having sizes of between 0.03 mm and 0.06 mm, and
   wherein said subjecting (d) of the homogenized powder to clinker production further comprises introducing oil-containing drill cutting sludge into the clinker production to thermally destruct contaminants.

2. The process of claim 1, wherein the water-containing drill cutting sludge and oil-containing drill cutting sludge constitute between 1.5% and 4.0% of the cement.

3. The process of claim 1, wherein the water-containing drill cutting sludge and oil-containing drill cutting sludge are obtained by cutting wells for at least one member selected from the group consisting of oil and gas.

4. A process for the disposal and recovery of components of drilling liquids and materials formed during drilling of gas and oil wells, said process comprising:
   extracting water-containing drilling sludge and oil-containing drilling sludge from the wells;
   crushing and pre-homogenizing the limestone and clay in the presence of the water-containing drilling sludge to form a pre-homogenized material; and
   introducing the oil-containing drilling sludge and the pre-homogenized material into a clinker production step for thermally destroying contaminants.

5. The process of claim 3, wherein the water-containing drilling sludge containing particles have sizes of between 0.03 mm and 0.06 mm.

6. The process of claim 5, wherein the clinker production step comprises pre-heating the pre-homogenized material in cyclones to between 280° C. and 350° C., pre-calcining the pre-heated material between 1,000° C. and 1,100° C. in a secondary burner, and feeding the pre-calcined material into a rotary kiln to heat the pre-calcined material to at least 1,450° C. and to generate gases of 1,800° C. to 2,000° C.

* * * * *